United States Patent Office 3,385,341
Patented May 28, 1968

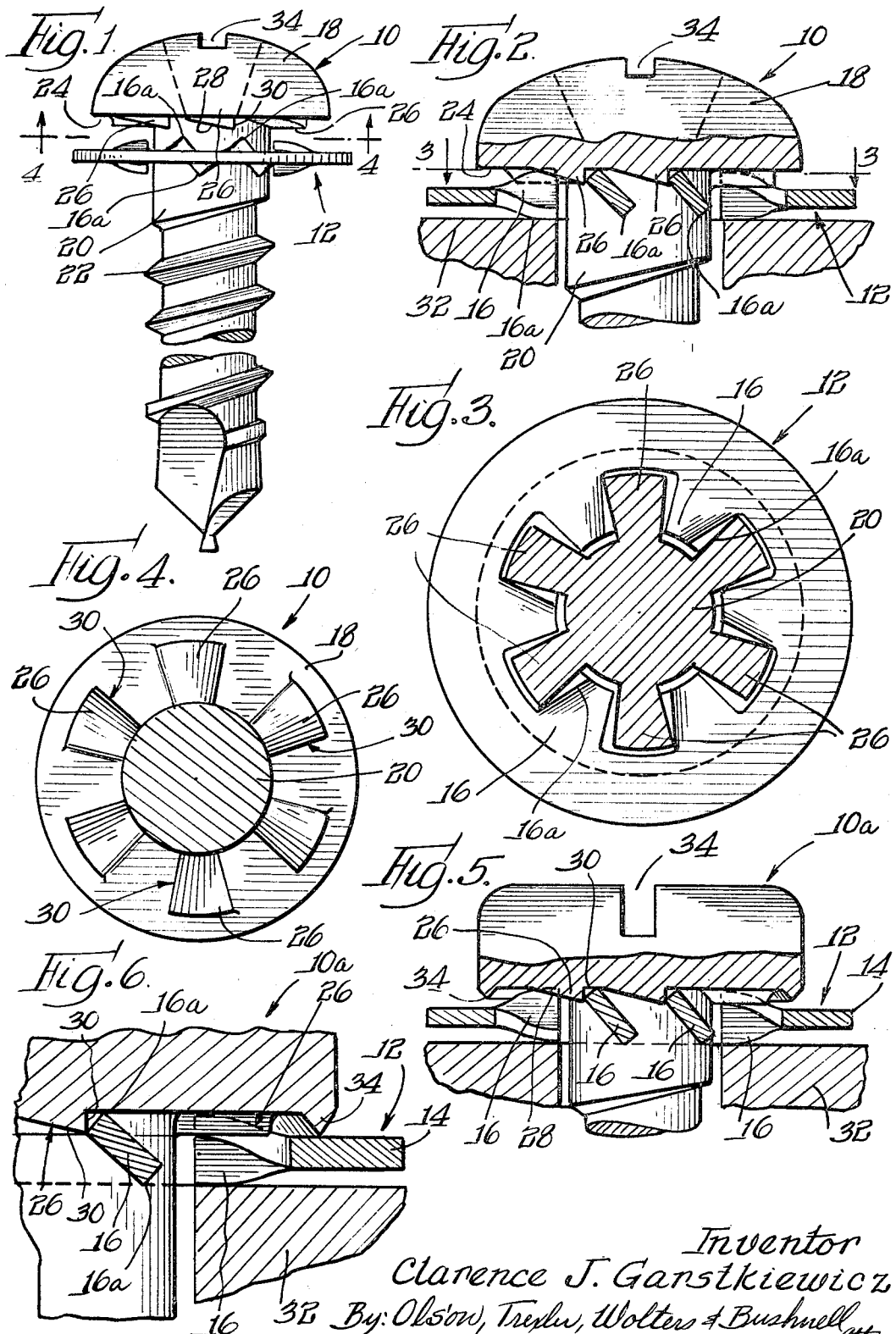

3,385,341
FASTENER DEVICE
Clarence J. Garstkiewicz, Palatine, Ill., assignor to Illinois Tool Works Inc., Chicago, Ill., a corporation of Delaware
Filed Feb. 21, 1966, Ser. No. 529,022
6 Claims. (Cl. 151—39)

ABSTRACT OF THE DISCLOSURE

The embodiment of the invention described herein comprises a rotary threaded fastener having an annular clamping surface adapted for engagement with a lockwasher. This surface includes a plurality of circumferentially spaced cam surfaces terminating in abutments extending axially from the underside of the fastener clamping surface, and a plurality of circumferentially spaced surface sections substantially coincident with a plane perpendicular to the fastener axis, each of said sections extending circumferentially from the lowest point of one cam surface to the next adjacent abutment or protuberance.

---

This invention relates generally to fastener devices and more particularly to fastener devices consisting of cooperating fastener elements such as a rotary threaded fastener element and a lockwasher disposed in operative association with the clamping side thereof.

More specifically, the present invention contemplates a fastener device composed of a rotary threaded fastener such as a screw element and lockwasher, as set forth above, which will interlock in a new and novel manner when clamped together so as to increase the locking effectiveness of the associated parts. To this end the invention contemplates a fastener arrangement wherein the clamping side of a rotary threaded fastener has a novel configuration to cooperate with teeth of a lockwasher so as to increase the effectiveness of the lockwasher in resisting unauthorized retrograde rotation of the clamping surface.

The present invention is of special significance in instances where lockwashers of the deflected tooth type are employed. In addition to the normal locking impingement of the washer teeth with a rotary clamping surface, the invention envisions the use of additional abutment means adapted to coact with the washer teeth in resisting forces tending to impart retrograde or loosening rotation to the rotary threaded fastener member.

The present invention also contemplates a fastener arrangement as set forth above, wherein the locking teeth of the washer element are secured against complete flattening when a rotary threaded fastener is clamped against the washer.

The foregoing and other objects and advantages will be more apparent from the following detailed description, when considered in connection with the accompanying drawings, wherein:

FIG. 1 is a side elevational view of telescopically associated fastener members, namely a rotary threaded fastener or screw member and a lockwasher illustrating one embodiment of the present invention;

FIG. 2 is an enlarged fragmentary view of the upper portion of the fastener device illustrated in FIG. 1 with portions of the lockwasher and screw member being broken away to reveal the structural details otherwise hidden;

FIG. 3 is a horizontal transverse sectional view taken substantially along the line 3—3 of FIG. 2, more clearly to illustrate the manner in which the lockwasher teeth are adapted to abut the complementary locking lugs or protuberances associated with the clamping side of the screw head;

FIG. 4 is a horizontal transverse sectional view taken substantially along the line 4—4 of FIG. 1;

FIG. 5 is a view similar to FIG. 2, disclosing a slightly modified screw head arrangement wherein an annular protuberance associated with the clamping side of the screw head serves both as a sealing member and also as means for preventing complete collapsing of the lockwasher teeth when the screw member is finally tightened thereagainst; and FIG. 6 is an enlarged fragmentary sectional view of the part as shown in FIG. 5, illustrating the function of the above-mentioned annular protuberance in providing a seal against the washer body as well as means for preventing complete unflexing or flattening of the washer teeth.

Referring now to the drawing more in detail, wherein like numerals have been employed to designate similar parts throughout the various views, it will be seen that the present invention contemplates the use of a rotary threaded fastener member such as the screw member designated generally by the numeral 10 and a lockwasher member designated generally by the numeral 12. In the disclosed embodiment of the invention, the lockwasher 12 is of the well-known sheet metal twisted-tooth type, which includes an annular body portion 14 and a plurality of locking prongs 16 formed integral with and extending radially inwardly from the inner margin of the body portion 14. Each prong is twisted or deflected from its root towards its free extremity so as to present work-engaging locking teeth 16a projecting beyond the bounding planes of the body portion 14.

The rotary threaded fastener 10 is a screw member having a head 18 and a shank 20 extending therefrom. In the disclosed embodiment, the external diameter of the thread 22 on the shank is slightly larger than the internal diameter of the lockwasher 12, so as to secure the washer against unauthorized axial separation from the screw member. While the entering extremity of the screw shank 20 is designed for drilling and tapping a hole in a workpiece, it should be understood that the invention is not limited to the use of any particular threaded shank arrangement. The particular pre-assembled screw and washer arrangement shown in the drawing has met with significant commercial success.

Attention is directed to the clamping side, or surface 24. A series of circumferentially and equally spaced lugs or protuberances 26 are provided along the clamping surface 24. Each of these lugs or protuberances 26 presents a cam surface 28 and a cooperating abutment surface 30.

It will be noted in FIGS. 1 and 2 that the cam surfaces 28 of the lugs 26 are inclined in the same general direction as the prongs 16. Thus as the head of the screw fastener is initially tightened against the teeth of the washer 12, the cam surfaces 28 engage and slide over the teeth 16a of the prongs until the screw has been tightened to its final position as illustrated in FIG. 2. In this position the teeth 16a of the washer prongs 16 lockingly impinge the clamping surface of the screw head 18 and the teeth 16a of the opposite side of the washer lockingly impinge the complementary surface of a workpiece 32. Tightening of the screw member within the workpiece may be occasioned by the use of a conventional turning tool or screwdriver adapted to be accommodated by a complementary recess 34 in the screw head 18. Forces tending to impart retrograde or loosening rotation to the screw member will be resisted by the locking impingment of the above-mentioned washer teeth 16a as clearly shown in FIG. 2.

In addition to the normal functioning of the lockwasher teeth 16a to counteract forces tending to loosen the screw, the abutment surfaces 30 of the lugs 26 are brought into play. As shown in FIG. 2, these abutment surfaces are adapted to engage adjacent edge portions of the prongs 16 in the immediate vicinity of the locking teeth 16a thereof. In the disclosed embodiment six equally spaced lugs 26 are employed, which are complementary to and adapted to be accommodated by six equally spaced areas separating the locking prongs 16. It is not absolutely essential that the number of lugs correspond with the number of spaces between the washer teeth. There may be instances where the number of lugs or protuberances is less than the number of spaces separating the washer prongs. The above-mentioned lugs 26 not only function to increase the aggressiveness of the fastener in resisting forces tending to rotate the device in a retrograde or loosening direction, but also counteract the tendency for the washer prongs to become flattened when tightened beneath the clamping surface of the rotary threaded fastener. Obviously the number of washer teeth as well as the number of prongs designed to cooperate therewith, will be determined by such factors as the nature of the device to be secured as well as the size of the washer element to be used in a particular application.

In FIGS. 5 and 6 a slightly modified rotary threaded fastener or screw element is shown, said screw member being designated generally by the numeral 10a. The only significant difference between the screw element 10 and the screw member 10a is the provision in the device 10a of an annular protuberance 34 extending axially from the clamping surface 34 at the outer margin of the screw head 18. In FIG. 5 the screw member and washer are disclosed just prior to the final tightening of the clamping surface of the screw head against the lockwasher. Upon engagement of the protuberance 34 with the body 14 of the lockwasher as shown in FIG. 6, an effective seal between the washer and the screw head is formed. Also, this engagement with the washer body serves to prevent complete flattening or untwisting of the washer prongs 16. As previously pointed out, the lugs 26 do cooperate to some extent in preventing complete flattening of the washer teeth, but the annular protuberance 34 affords absoulte assurance that the washer prongs will not be completely flattened regardless of the amount of pressure applied by the clamping side of the screw head.

From the foregoing, it will be apparent that the present invention contemplates a novel and very practical fastener device. It may be very appropriately employed in instances where a rotary threaded fastener member is to be used in telescopic association with a lockwasher of the type employing prongs or the like deflected to present locking teeth projecting beyond the bounding plane of the washer body. Obviously the invention is not limited to the use of the specific form of threaded screw member shown in the drawings, nor is it limited to the particular washer element disclosed herein. The provision of the cam-like surfaces, as well as the abutment surfaces of the lugs distributed along the clamping side of the rotary threaded fastener member, assures increased aggressive resistance to forces tending to loosen the parts. The sheet metal lockwasher, as well as the screw menber disclosed herein, may be produced by the practice of conventional stamping metal forming, as well as thread-producing equipment. Thus the fastener device of the present invention may be manufactured economically. When the invention is incorporated in a preassembled fastener unit, such as the device shown in FIG. 1, it is important that the distance between the screw thread and the clamping side of the head be greater than the overall axial thickness of the lockwasher. In other words, sufficient axial distance between the clamping side of the rotary threaded fastener and the element such as the extruded thread convolution which traps the lockwasher, should be great enough to assure proper coaction between the lockwasher and the protuberances associated with the clamping side of the threaded fastener.

While for purposes of disclosure, certain structural embodiments have been illustrated and described herein, it should be understood that the invention contemplates other modifications and changes without departing from the spirit and scope of the appended claims.

The invention is claimed as follows:

1. A fastener device including, in combination, a rotary threaded fastener member having a clamping surface, a sheet metal lockwasher operatively associated with said clamping surface, said lockwasher including an annular body and a plurality of integral circumferentially spaced prongs extending radially inwardly from said annular body and having axially deflected portions inclined with respect to the plane of the washer body, each prong being twisted from its root to its free extremity so as to present work engaging locking teeth projecting axially beyond the bounding planes of said body, and circumferentially spaced protuberances extending axially from the clamping surface of said rotary threaded fastener member and equal in number to the number of spaces separating the washer prongs, and each of said protuberances including a cam surface inclined with respect to the plane of said clamping surface in the same direction as the deflected portions of the washer prongs to permit sliding engagement of said cam surfaces with the locking teeth on one side of the washer when the threaded fastener is rotated in a tightening direction, each of said protuberances also including an abutment surface in the vicinity of the high point of said cam surface adapted to interlock with the tooth of a complementary deflected prong portion so as to resist retrograde rotation of the threaded fastener member, said clamping surface also presenting a plurality of circumferentially spaced planar surface sections substantially coincident with a plane perpendicular to the fastener axis, each of said planar sections extending circumferentially from the base of the abutment surface of one protuberance to the beginning of the inclined cam surface of the next protuberance, each washer tooth providing a line bite engagement with a complementary planar section, said protuberances having a radial extent sufficiently less than over-all radial width of the washer to be accommodated by a complementary space between adjacent washer teeth.

2. A fastener device as set forth in claim 1 wherein the rotary threaded fastener is provided with a shank extending axially from the clamping surface for telescopically accommodating the sheet metal lockwasher.

3. A fastener device as set forth in claim 2 wherein the shank is provided with circumferentially disposed means defining a maximum diameter greater than the internal diameter of the lockwasher for securing said lockwashers against separation from the rotary threaded fastener and spaced axially from the clamping surface a distance which is sufficient to permit free rotation of the washer and efficient functioning of the washer teeth and protuberances when the fastener device is tightened against a work surface.

4. A fastener device as set forth in claim 1 wherein the abutment surface of each protuberance has an axial extent at least as great as the thickness of the washer stock.

5. A fastener device as set forth in claim 1 including circumferentially disposed abutment means adapted to engage the washer body and projecting axially from the clamping surface of the rotary threaded fastener a distance sufficient to prevent complete flattening of the washer prongs upon final tightening of the fastener device against a work surface.

6. A fastener device as set forth in claim 5 wherein the circumferentially disposed abutment means is in the form of an annulus and is positioned along and extending axially from the outer margin of the clamping surface of the rotary threaded fastener.

References Cited

UNITED STATES PATENTS

| | | | |
|---|---|---|---|
| 3,016,248 | 1/1962 | Lindberg | 151—41 |
| 904,606 | 11/1908 | Dressler | 151—13 |
| 907,473 | 12/1908 | Detray | 151—39 |
| 950,629 | 3/1910 | Blossom | 151—13 |
| 1,033,585 | 7/1912 | Hickey et al. | 151—41 |
| 1,106,248 | 8/1914 | Simpson | 151—39 |
| 1,537,478 | 5/1925 | Lipke | 151—13 |
| 2,113,425 | 4/1938 | Crowther | 151—37 |
| 2,715,929 | 8/1955 | Knohl | 151—37 |
| 3,275,055 | 9/1966 | Gutshall | 151—37 |

EDWARD C. ALLEN, *Primary Examiner.*